(12) United States Patent
Fu et al.

(10) Patent No.: US 7,023,357 B2
(45) Date of Patent: Apr. 4, 2006

(54) PLUGGABLE MECHANISM FOR WIRELESS REMOTE CONTROL

(75) Inventors: Rong Yao Fu, Beijing (CN); Wei Li, Beijing (CN); Guan Nuan Liu, Beijing (CN); Song Song, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 10/646,407

(22) Filed: Aug. 22, 2003

(65) Prior Publication Data

US 2004/0164621 A1 Aug. 26, 2004

(30) Foreign Application Priority Data

Aug. 23, 2002 (CN) .............................. 02129434 A

(51) Int. Cl.
G08C 19/00 (2006.01)
G05B 11/01 (2006.01)

(52) U.S. Cl. ........................... 340/825.72; 340/825.69; 340/310.11; 340/310.18

(58) Field of Classification Search ........... 340/825.72, 340/825.69, 310.11, 310.18; 307/117, 140; 455/423
See application file for complete search history.

(56) References Cited

U.S. PATENT DOCUMENTS

| 4,001,527 | A | * | 1/1977 | Hulshizer | ............... 200/38 FB |
| 5,036,214 | A | * | 7/1991 | Zerillo | ....................... 307/140 |
| 5,731,664 | A | * | 3/1998 | Posa | ..................... 340/825.72 |
| 5,738,496 | A | | 4/1998 | Mehta | |
| 5,793,125 | A | | 8/1998 | Tarng | |
| 5,839,097 | A | * | 11/1998 | Klausner | ............... 340/825.69 |
| 5,864,184 | A | | 1/1999 | Platner et al. | |
| 5,895,985 | A | * | 4/1999 | Fischer | ....................... 307/116 |
| 6,211,581 | B1 | | 4/2001 | Farrant | |
| 6,297,746 | B1 | * | 10/2001 | Nakazawa et al. | ..... 340/825.89 |
| 6,374,079 | B1 | * | 4/2002 | Hsu | .......................... 455/11.1 |

* cited by examiner

Primary Examiner—Brian Zimmerman
Assistant Examiner—Clara Yang
(74) Attorney, Agent, or Firm—Stephen C. Kaufman

(57) ABSTRACT

A pluggable mechanism for wireless remote control comprising a control panel for controlling an object, the control panel having a receptacle; and a pluggable unit having a plug that is suitable to be plugged into the receptacle of the control panel, and being capable of receiving remote wireless control commands, the pluggable unit cooperates with the control panel to control the controlled object in response to the received wireless control commands when said pluggable unit being plugged into said receptacle of said control panel. The pluggable mechanism of this invention enables wireless remote control on a manually controlled panel and reduces the cost for implementing new wireless communication technologies.

14 Claims, 12 Drawing Sheets

PLUGGABLE MECHANISM FOR WIRELESS REMOTE CONTROL

TECHNICAL FIELD

The present invention relates to wireless remote control, and particularly, to a pluggable mechanism on a control panel for remote control with wireless communications protocols.

TECHNICAL BACKGROUND

Due to the conveniences and usability, wireless remote control technologies have been widely used in numerous electrical devices, such as television sets, video cassette recorders, refrigerators and other appliances which are controlled by the infrared remote controllers. By using remote control technologies, people may live more comfortably and save more manpower.

Meanwhile, more and more new wireless technologies have emerged and provided more advantages and lower costs than older ones. For example, Bluetooth is a wireless communication technology which has been applied in practice recently. It can be used to control electrical/electronic devices and get the status of the devices. Furthermore, because of the intelligence and scalability, it can manage almost all kinds of devices so as to save energy, increase security and reduce costs.

Nevertheless, in the practical life, there are still many devices which do not have wireless remote control function, such as electric light switches. From technology point of view, integration of an embedded wireless system and a mechanical controller is a feasible solution to achieve the wireless remote control to the electric light. However, changing the switching mode from manual control to wireless remote control requires many updates in manufacture and installation and would not be able to utilize the existing facilities and investment properly. Moreover, due to the changes of operation mode and the addition of new functions, users have to study new skills. This may cause some extra costs and inconveniences. As a result, the consumers may not choose a control panel with an integrated remote control module.

Another problem is that wireless communication techniques are developing fast. But for the devices which have been produced and used in practice, it is impossible to update them with the new wireless techniques because the wireless communication units have been integrated in those devices already. Thus, the lifetime of the device is limited and the updating cost is increased.

SUMMARY OF THE INVENTION

An objective of the present invention is to provide a pluggable mechanism for wireless remote control. Instead of replacing an existing controller, the wireless remote control functions can be enabled by adding a pluggable extension unit into the existing controller.

The pluggable mechanism for wireless remote control provided by the present invention includes a control panel for controlling the object, said control panel having a receptacle; a pluggable unit having a plug which is suitable to be plugged into the receptacle of said control panel and being capable of receiving remote wireless control commands, said pluggable unit cooperating with said control panel to control said object in response to said received wireless control commands when said pluggable unit being plugged into said receptacle of said control panel.

The present invention also provides a pluggable unit for the above-mentioned pluggable remote control mechanism, and a wireless remote control system including a remote controller device and the above-mentioned pluggable remote control mechanism.

BRIEF DESCRIPTION OF THE DRAWINGS

The objectives, features and advantages of the present invention will become apparent through following description of the embodiments of the present invention in conjunction with the following drawings.

DETAILED DESCRIPTION OF THE PREFERRED EMBODIMENTS

Figure 1:
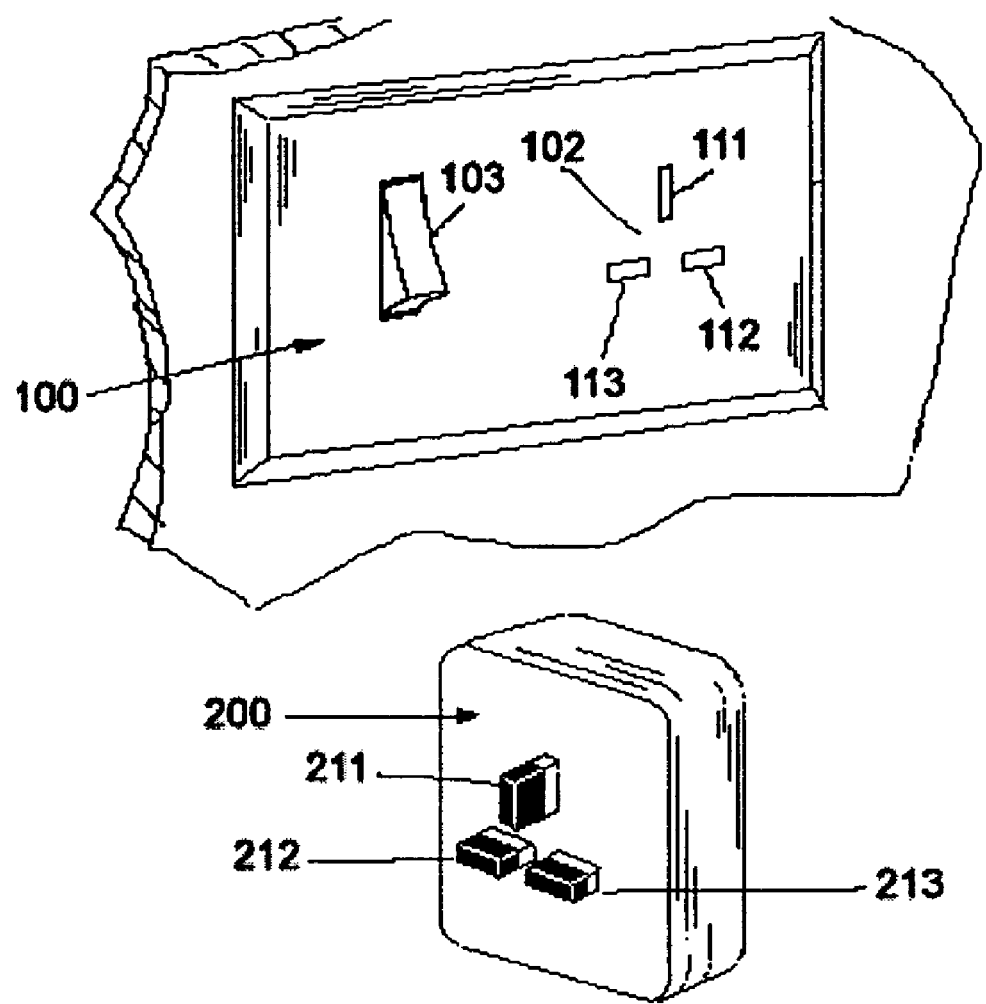
FIG. 1 shows the configuration of a pluggable mechanism for wireless remote control according to a first embodiment of the present invention.

FIG. 1 shows the configuration of a pluggable mechanism for wireless remote control according to a first embodiment of the present invention. As shown in FIG. 1, the pluggable mechanism for wireless remote control of the present invention comprises a manual control panel 100 and a pluggable unit 200, wherein the control panel 100 can be installed on the wall or on other supports. Similar to the conventional control panel, there may be a manual switch 103 on the control panel 100 and at the same time, a receptacle 102 for accommodating the pluggable unit 200 is provided thereon. In the embodiment shown in FIG. 1, the receptacle 102 has three contacts, i.e. contacts 111, 112 and 113.

Figure 2:
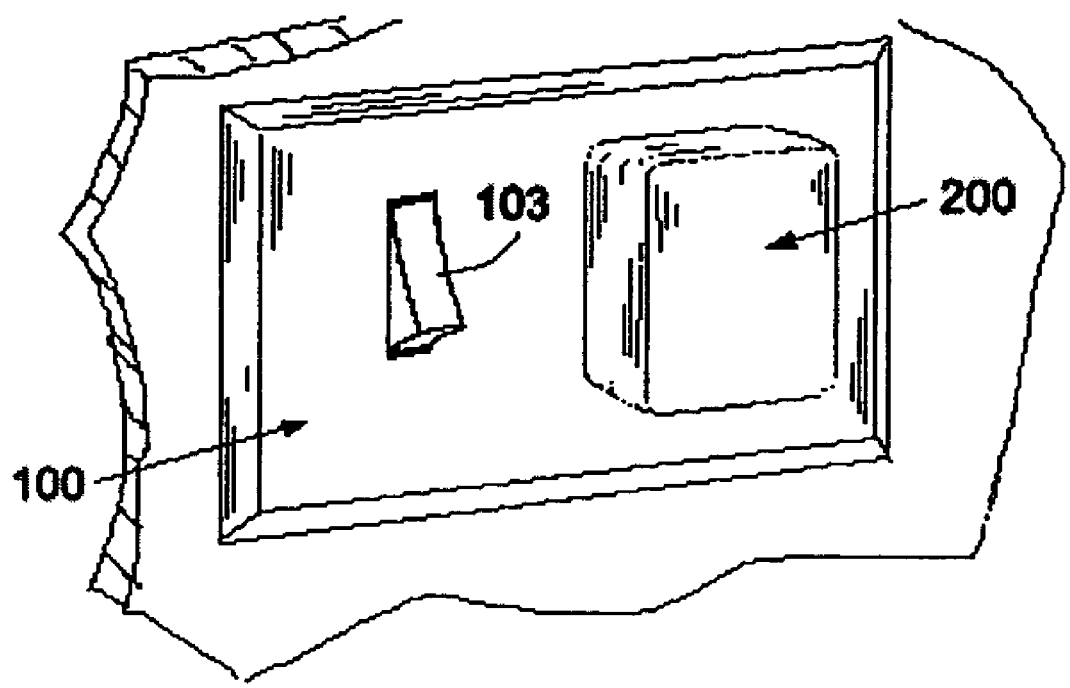
FIG. 2 shows the pluggable mechanism for wireless remote control according to the embodiment of the present invention shown in FIG. 1, wherein the pluggable unit is plugged into the control panel.

The pluggable unit 200 in FIG. 1 has a plug corresponding to the receptacle 102 of the control panel 100. The plug has three pins 211, 212 and 213. The pluggable mechanism for wireless remote control of the present embodiment is designed in such a way that said pluggable unit 200 can be plugged into the receptacle 102 of the control panel 100 through the plug so that the pins 211, 212 and 213 of the pluggable unit 200 can contact with the contacts 111, 112 and 113 of the receptacle 102 on the control panel 100, respectively. FIG. 2 shows the case where the pluggable unit 200 is plugged into the control panel 100.

Those skilled in the art will appreciate that the appearances of the control panel 100 and the pluggable unit 200 are changeable and the shapes of the receptacle and pins can be changed too.

Figure 3:
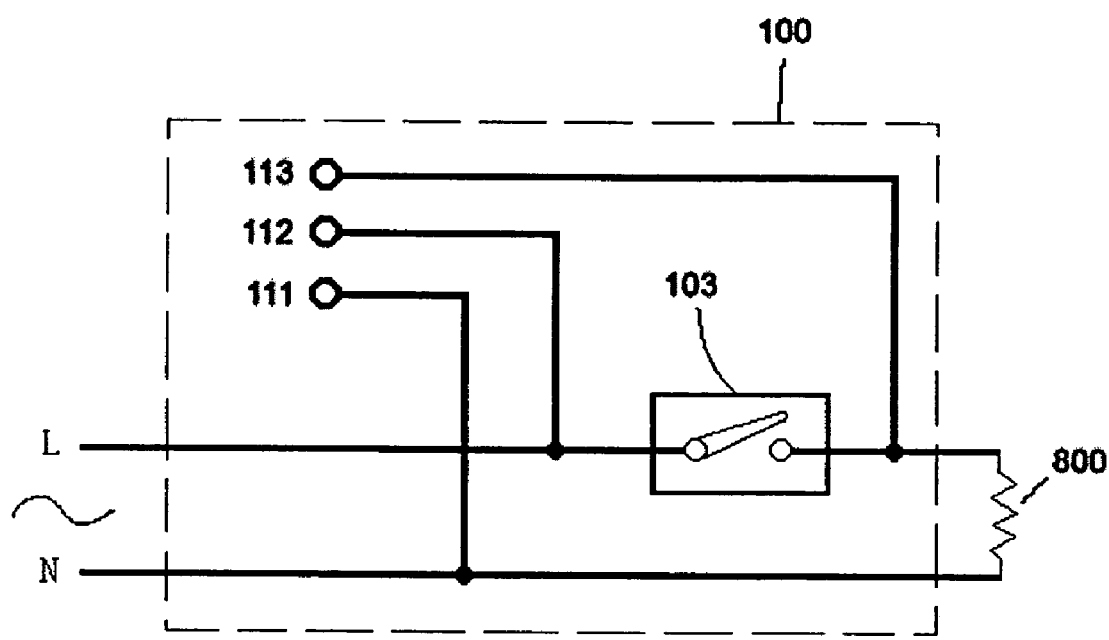
FIG. 3 is a schematic diagram showing the circuit of the control panel of the pluggable mechanism for wireless remote control according to the first embodiment of the present invention.

FIG. 3 is a schematic diagram showing the circuit of the control panel 100 of the pluggable mechanism for wireless remote control according to the first embodiment of the present invention. As shown in FIG. 3, the control panel 100 is a manual switch control panel for controlling objects, such as an electric lights and so on. The control panel 100 is connected to the live line (L) and the null/ground line (N) of the power supply through two input ends, respectively. The other side of the control panel 100 is connected to the object 800 through two output ends, respectively. A manual switch 103 is installed at the live line. The two ends of the manual switch 103 are further connected to the contacts 112 and 113 respectively. The contact 111 is connected to the null line. The manual switch 103 may be in various forms, for instance, a push switch, a pull switch or a touch switch.

Figure 4A:
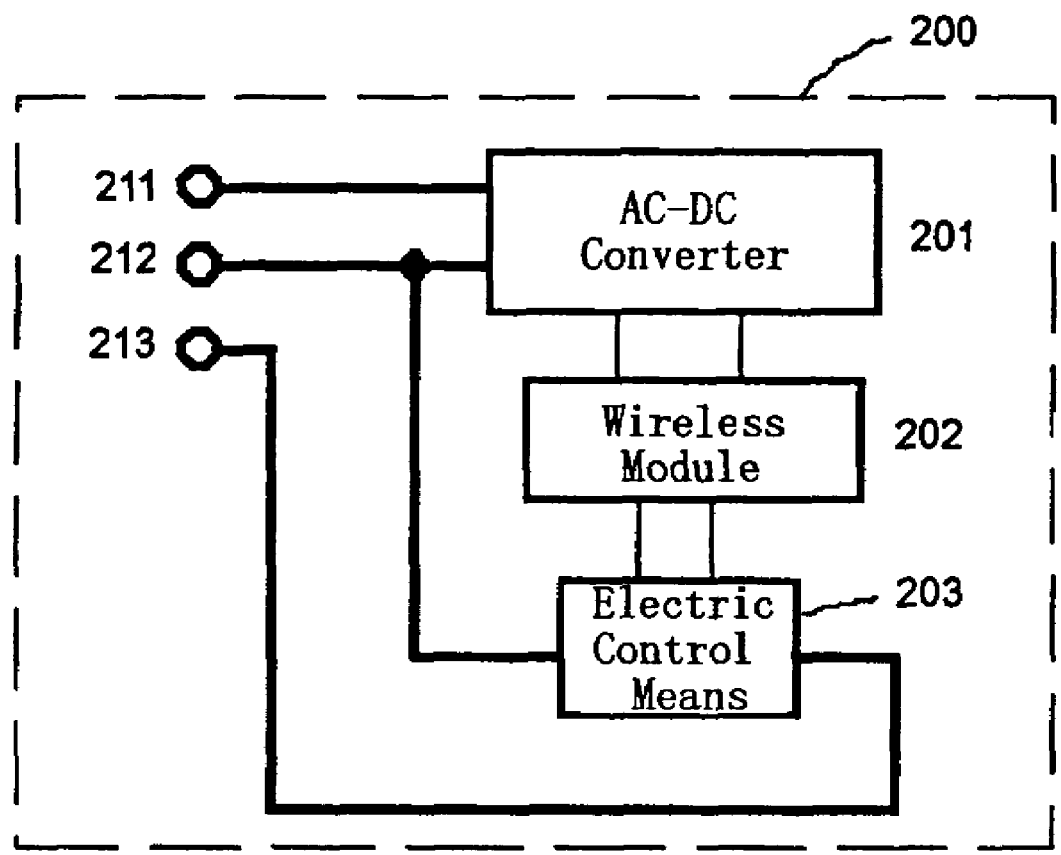
FIG. 4A is a schematic diagram showing the circuit of the pluggable unit of the pluggable mechanism for wireless remote control according to the first embodiment of the present invention.

FIG. 4A is a schematic diagram showing the circuit of the pluggable unit of the pluggable mechanism for wireless remote control according to the first embodiment of the present invention. As shown in FIG. 4A, the pluggable unit 200 has three pins 211, 212 and 213. When the pluggable unit 200 is plugged into the receptacle 102 of the control panel 100, the pins 211, 212 and 213 contact with the contacts 111, 112 and 113 respectively. In the pluggable unit 200, the pins 211 and 212 are connected to a AC-DC converter 201, the DC output of the AC-DC converter 201 provides power supply to a wireless module 202. An electric control means 203 is connected in series between the pin 212 and the pin 213; the input of the electric control means 203 is connected to the output of the wireless module 202. In the following, detailed description will be given to the components of the pluggable unit 200 of the present embodiment, with reference to FIGS. 4B to 4F.

Figure 4B:
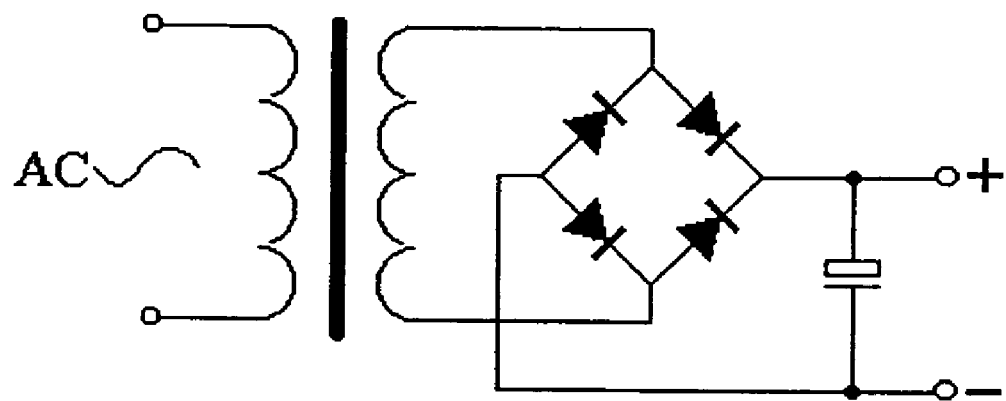
FIGS. 4B and 4C are schematic diagrams showing an AC-DC converter applicable for the present invention.
Figure 4C:
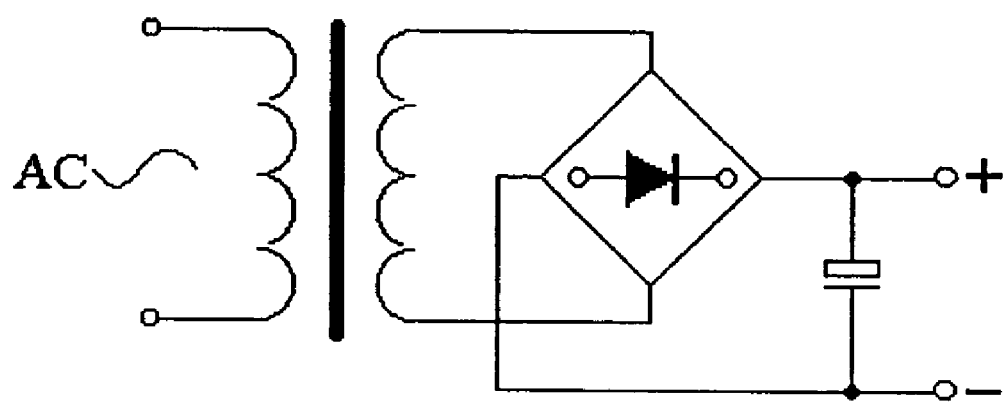

FIGS. 4B and 4C are schematic diagrams showing the AC-DC converters applicable for the present invention. As shown in FIG. 4B, the rectifying part of the AC-DC converter for the present embodiment can be constituted of discrete components or a bridge rectifier. Alternatively, as shown in FIG. 4C, said rectifying part can be implemented as a switching power supply to reduce the cost and size.

Figure 4D:
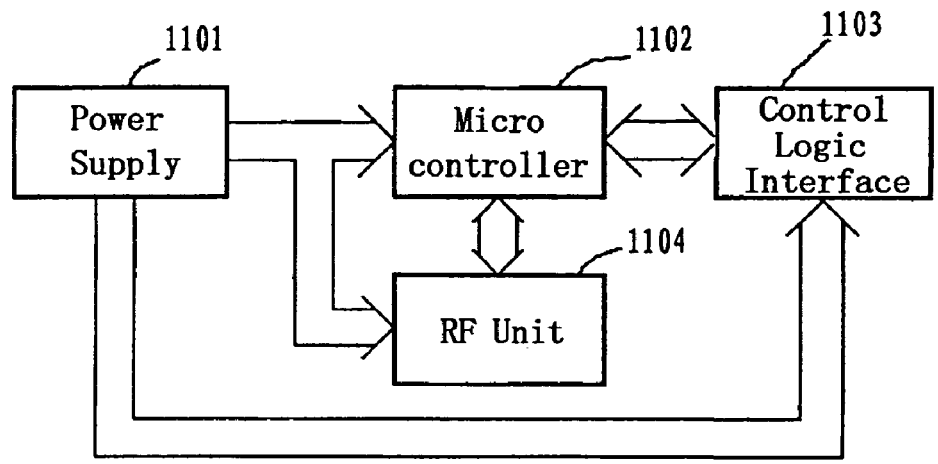
FIG. 4D is a schematic diagram showing a wireless module for the present invention with a relatively simple structure.

FIG. 4D is a schematic diagram showing a wireless module for the present invention with a relatively simple structure. As shown in FIG. 4D, the wireless module 202 includes a microcontroller 1102, an RF unit 1104, a control logic interface 1103 and a power supply 1101, wherein the power supply 1101 represents the DC power supply from the above-mentioned AC-DC converter 201 or batteries. It should be noted that if batteries are used as the power supply, the above-mentioned AC-DC converter in the present embodiment is not necessary. The power supply 1101 supplies to the microcontroller 1102 and the RF unit 1104. The RF unit 1104 is used to perform the function of radio frequency wireless communications, including modulation and demodulation. The RF unit 1104 transmits the control command received from a remote wireless controller unit (not shown) to the microcontroller 1102. In response to the control command, the microcontroller 1102 executes pre-programmed instruction programs to generate a control signal. The generated control signal is output from the wireless module 202 through the control logic interface 1103. The control logic interface 1103 is an interface circuit between the microcontroller 1102 and the external circuit.

Here it should be noted that the RF unit in the wireless module shown in FIG. 4D can be replaced by the wireless communication devices supporting other wireless communications techniques (e.g. infrared, supersonic, laser, etc.) and receive the remote control commands sent through the corresponding communication techniques. Thus, the pluggable mechanism of the present invention may be applicable to various wireless transmission techniques.

Figure 4E:
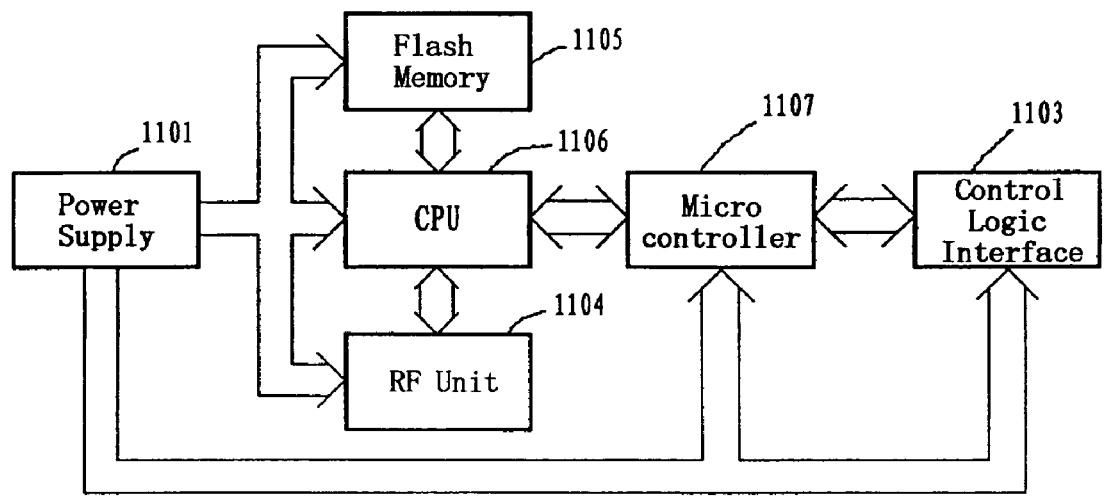
FIG. 4E is a schematic diagram showing a wireless module for the present invention with a relatively complex structure.

FIG. 4E is a schematic diagram showing a wireless module according to the present invention with a relatively complex structure. The wireless module 202 of the present invention shown in FIG. 4E is applicable to advanced radio frequency wireless transmission techniques (especially applicable to the Bluetooth). Differing from the wireless module shown in FIG. 4D, the microcontroller 1102 is removed and a CPU 1106, a flash memory 1105 and a microcontroller 1107 are added, wherein the CPU 1106 is used to implement a communication protocol stack, dispatch tasks, interpret the control commands and respond to the requests coming from the controller. The CPU 1106 can send the control protocols to the remote end through negotiation, and the remote end can acquire the status of the controlled device through a request. The CPU 1106 can be either integrated with the flash memory 1105 and the RF unit 1104 together, or standing alone. The microcontroller 1107 can be a microcontroller with multiple inputs and outputs, such as series 51 single chip processor, which is well known in the art. If the CPU 1106 can be connected to the control logic interface directly and the number of output control terminals meets the requirement, then the microcontroller 1107 is not necessary. When the output of the CPU 1106 cannot meet the requirement of the control logic interface, the microcontroller 1107 is needed for the conversion and extension of the control logic interface. The flash memory 1105 is used for storing the wireless communication protocol stack and the software application programs to be provided to the CPU 1106 for execution. It should be understood that the flash memory 1105 may be the memories in other forms, such as EPROM, CMOS, etc. Of course, in addition to that shown in FIGS. 4D and 4E, the wireless module 202 of the present invention may be in other forms.

The electric control means 203 of the present embodiment can be an electronic switch, such as relay switch, siliconcontrolled switch or the like. Thus, the pluggable mechanism for wireless remote control of the present embodiment can achieve remote switch control to the controlled object. Meanwhile, the electric control means 203 may also be a digital potentiometer, voltage divider or the like, thus, the present embodiment may realize multiple controls to the controlled object, including power control, voltage control, current control, etc.

Figure 4F:
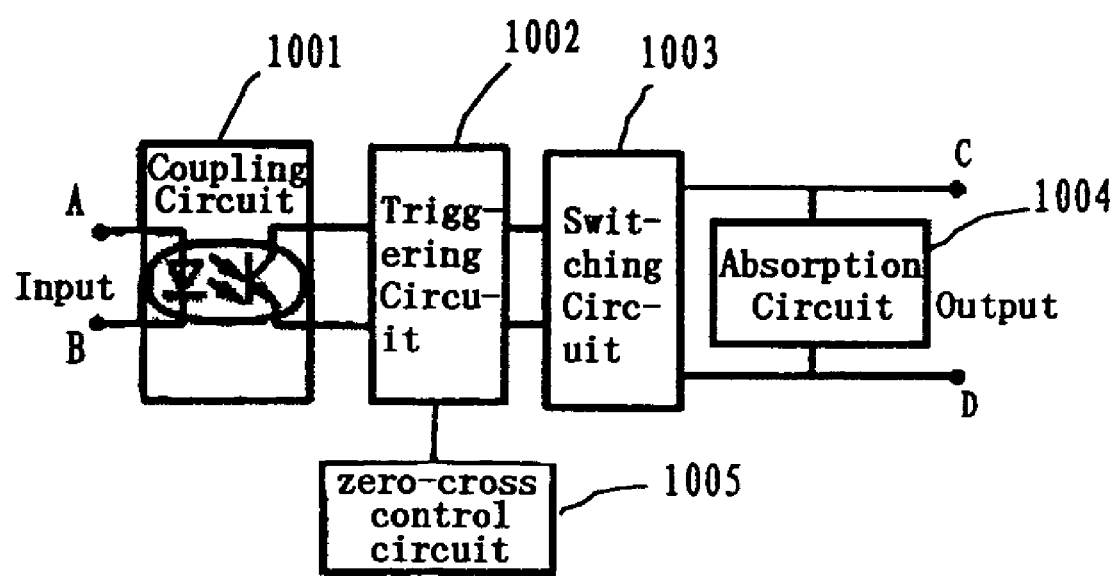
FIG. 4F is a schematic diagram showing an (electronic switch of the type of solid state relay) which can be used in the electric control means of the present invention.

FIG. 4F is a schematic diagram showing (an electronic switch of the type of solid state relay), which can be used in the electric control means of the present invention. As shown in FIG. 4F, the electronic switch consists of a coupling circuit 1001, a triggering circuit 1002, a switching circuit 1003, an absorption circuit 1004 and a zero-cross control circuit 1005. A control signal is input from the input terminals A and B, via the coupling circuit 1001 and the triggering circuit 1002, and finally leading the output terminals C and D controlled by the switching circuit 1003 to be open or closed. The electronic switch in FIG. 4F is suitable to control an object in an AC circuit. When the present embodiment is used to control an object in a DC circuit, the absorption circuit 1004 and the zero-cross control circuit 1005 can be removed. Since the structures of the electronic switch, digital potentiometer, voltage divider, etc. are well known to those skilled in the art, detailed description will not be given here.

In conjunction with FIG. 3 and FIGS. 4A–F, it can be seen that when the pluggable unit 200 is not plugged into the receptacle 102 of the control panel 100, the control panel 100 is operated just as an conventional switch: when switching on the manual switch 103, the object 800 (such as an electric light) is in live state and begins to work; when switching off the manual switch 103, the power supply is cut and the object 800 stops working.

When the pluggable unit 200 is plugged into the receptacle 102 of the control panel 100 and the manual switch 103 of the control panel 100 is switched off, the three pins 211,212 and 213 of the pluggable unit 200 contact to the contacts 111, 112 and 113 of the control panel 100, respectively. At this time, the AC power line supplies the AC-DC converter 201 through the contacts between pins 211, 212 and the contacts 111, 112. By the conversion of the AC-DC converter 201, DC power supply is provided to the wireless module 202. The wireless module 202, in its working state, receives a control command from a remote wireless controller (not shown), and sends a control signal to the electric control means 203 in response to the control command, so that the object 800 is controlled by the electric control means 203.

After the wireless connection between the remote controller device and the wireless module 202 being established, the wireless module 202 will receive commands from the remote controller device, such as "Switch On", "Switch Off", "Get Status" and so on. When the wireless module 202 receives a "Switch On" command, it will send an "On" signal to the electric control means 203, and the electric control means 203 will be turned on accordingly. When the wireless module 202 receives a "Switch Off" command, it will send an "Off" signal to the electric control means 203, and the electric control means 203 will be turned off accordingly. When the wireless module 202 receives a "Get Status" command, it will read the current status of the electric control means first, then send the status back to the remote controller device.

If the above embodiment is applied, because the control panel 100 and the pluggable unit 200 are designed to be separate from each other, the manufacture and installation of the control panel 100 are as same as that of an conventional control panel, and the cost is almost the same. Therefore, the users can install and use them as usual. When it is desired to add remote control function, instead of replacing the existing control panel 100, the users only need to buy a pluggable unit 200, whereby the users' initial investment can be protected. On the other hand, when the user does not want to use the remote controller, he/she may use manual switch 103 on the control panel 100 as well.

Additionally, when a new wireless communication technique appears, since it is convenient to replace the pluggable unit 200 separately, there is no need to buy and install a control panel 100 again. The user can use the new technique conveniently and economically and take the advantages brought by it.

Figure 5:
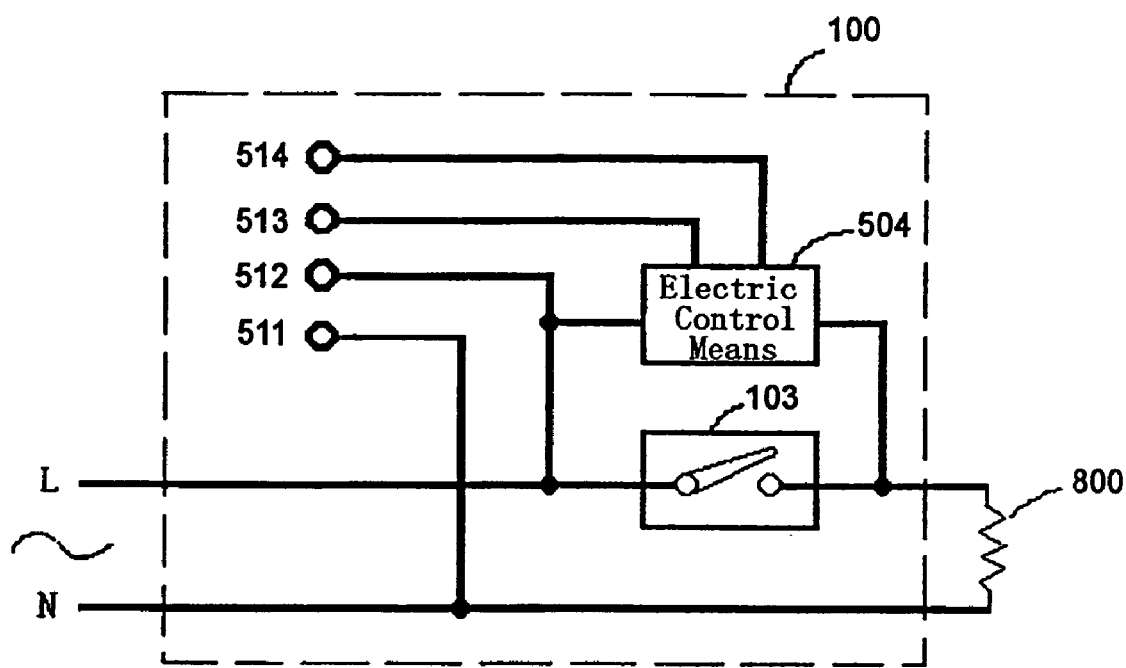
FIG. 5 is a schematic diagram showing the circuit of the control panel of the pluggable mechanism for wireless remote control according to a second embodiment of the present invention.
Figure 6:
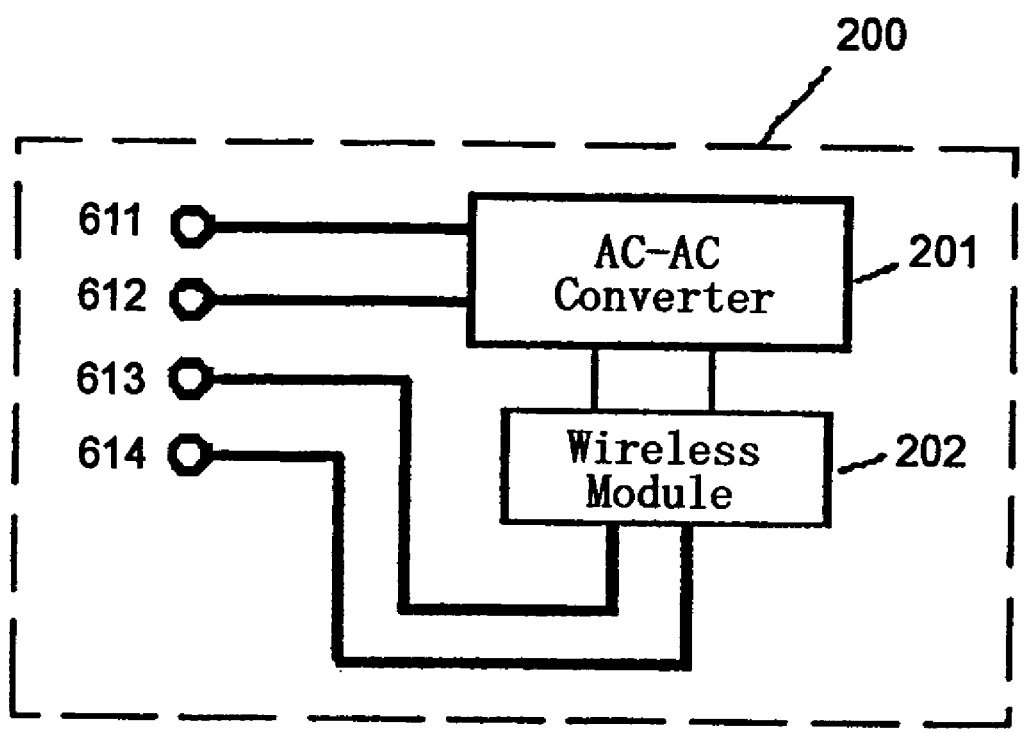
FIG. 6 is a schematic diagram showing the circuit of the pluggable unit of the pluggable mechanism for wireless remote control according to the second embodiment of the present invention.

Next, a second embodiment of the present invention will be described in conjunction with FIGS. 5 and 6. FIG. 5 is a schematic diagram showing the circuit of the control panel of the pluggable mechanism for wireless remote control according to the second embodiment of the present invention, and FIG. 6 is a schematic diagram showing the circuit of the pluggable unit according to the present embodiment. For simplicity, the same description as that of the first embodiment will be omitted.

In the present embodiment, in order to reduce the size of the pluggable unit 200, the electric control means, the electric control means 504 in the present embodiment, is put into the control panel 100. As shown in FIG. 5, different from the foregoing embodiment, the control panel 100 of the present embodiment has four contacts 511, 512, 513 and 514; correspondingly, as shown in FIG. 6, the pluggable unit 200 also has four pins 611, 612, 613 and 614. When the pluggable unit 200 is plugged into the receptacle 102 of the control panel 100, the contacts 511–514 of the control panel 100 will contact with the pins 611–614 of the pluggable unit 200, respectively.

In the control panel 100, as shown in FIG. 5, the contacts 511 and 512 are connected to the null/ground line (N) and the live line (L) of the power supply, respectively. And the contacts 513 and 514 are connected to the control input ends of the electric control means 504, respectively. The electric control means 504 is connected with the manual switch 103 in parallel. In the pluggable unit 200, as shown in FIG. 6, the pins 611 and 612 are connected to the input ends of the AC-DC converter 201, respectively. The pins 613 and 614 are connected to the output ends of the wireless module 202, respectively.

When the pluggable unit 200 is plugged into the receptacle 102 of the control panel 100 and the manual switch 103 of the control panel 100 is in a state of being switched off, the AC-DC converter 201 is provided with the AC power supply through the contacts between the pins 611, 612 and the contacts 511, 512. By the conversion of the AC-DC converter 201, DC power supply is provided to the wireless module 202. In response to the control command transmitted through wireless communication, a control signal sent by the wireless module 202 is transferred to the control input ends of the electric control means 504 in the control panel 100 through the contacts between the pins 613, 614 and the contacts 513, 514. Further, the electric control means 504, in response to the control signal, performs control to the controlled object 800.

In the present embodiment, due to putting the electric control means 504 into the control panel 100, the objective of reducing the size of the pluggable unit 200 is achieved. By eliminating the space limitation, the functionality of the electric control means 504 can be enhanced.

Figure 7:
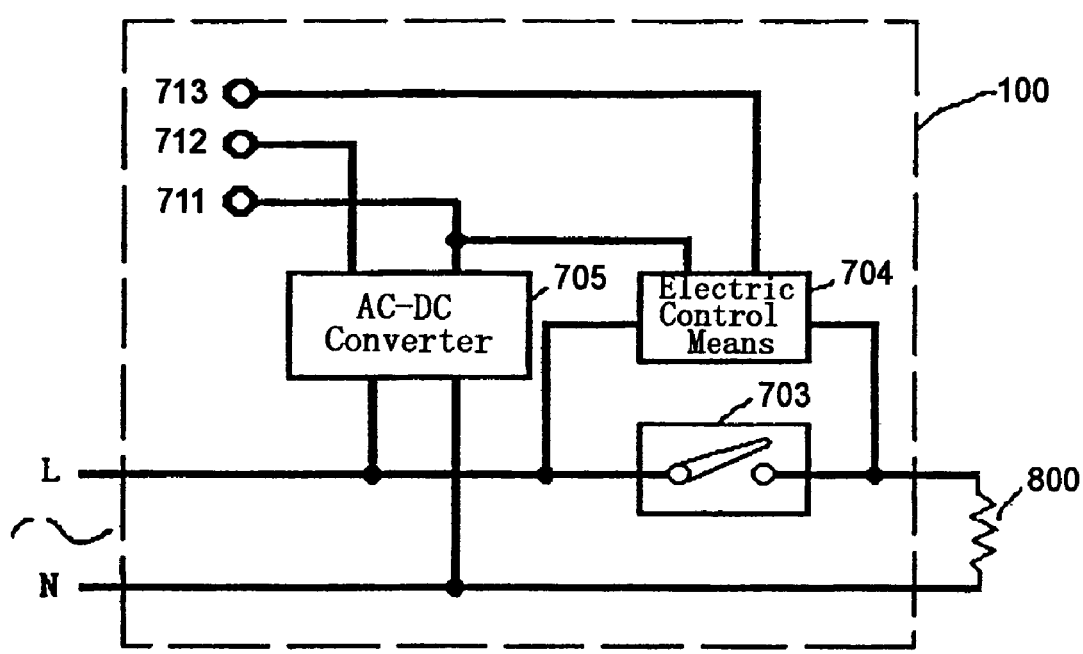
FIG. 7 is a schematic diagram showing the circuit of the control panel of the pluggable mechanism for wireless remote control according to a third embodiment of the present invention.
Figure 8:
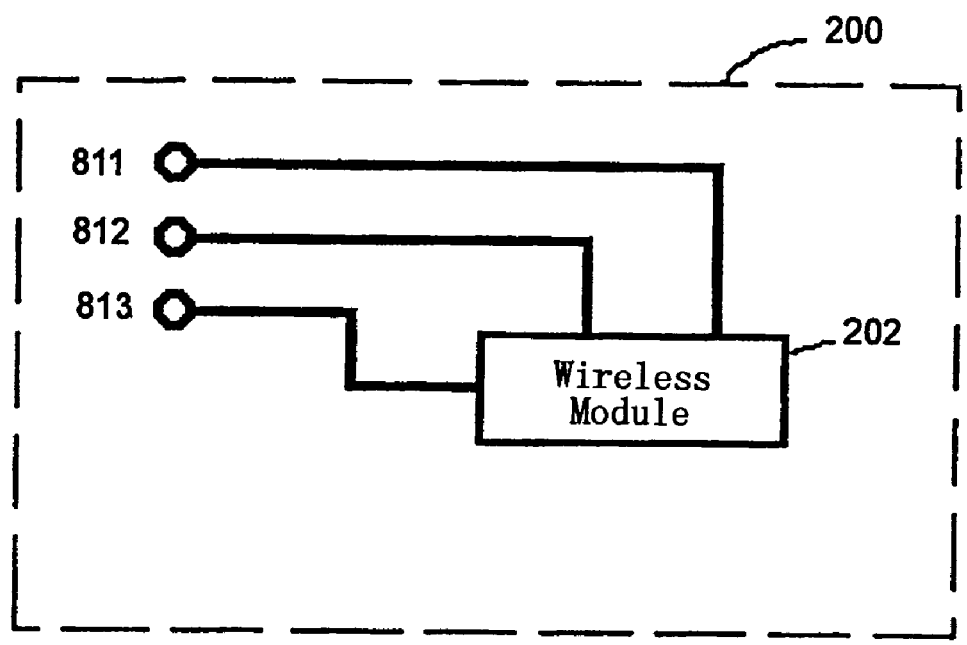
FIG. 8 is a schematic diagram showing the circuit of the pluggable unit of the pluggable mechanism for wireless remote control according to the third embodiment of the present invention.

Next, a third embodiment of the present invention will be described in conjunction with FIGS. 7 and 8. FIG. 7 is a schematic diagram showing the control panel of the pluggable mechanism for wireless remote control according to the third embodiment of the present invention, and FIG. 8 is a schematic diagram showing the pluggable unit according to the present embodiment. For simplicity, the same description as that of the above embodiments will be omitted.

In the present embodiment, the electric control means and the AC-DC converter are both put into the control panel 100. As shown in FIG. 7, there are an AC-DC converter 705, an electric control means 704 and three contacts 711, 712 and 713 in the control panel 100. The AC input ends of the AC-DC converter 705 are connected to the live line (L) and the null/ground line (N), respectively, of the AC power supply, and the DC output ends are connected to the contacts 711 and 712, respectively. The electric control means 704 is connected with the manual switch 703 in parallel, and its input end is connected to the contact 713.

As shown in FIG. 8, the pluggable unit 200 has a wireless module 202 and three pins 811, 812 and 813, wherein the input ends for power supply of the wireless module 202 are connected to the pins 811 and 812, and the output end of the wireless module is connected to the pin 813.

When the pluggable unit 200 of the present embodiment is plugged into the receptacle 102 of the control panel 100, the pins 811–813 of the pluggable unit 200 contact with the contacts 711–713 of the control panel 100. The AC power coming from the AC power supply is converted into the DC power for the wireless module 202 of the pluggable unit 200 by the AC-DC converter 705 in the control panel 100. Then the DC power is supplied to the wireless module 202 through the contact between pins 811, 812 and the contacts 711, 712. A control signal generated by the wireless module 202 according to the control command transmitted through wireless communication is transferred to the electric control means 704 through the contact between the pin 813 and the contact 713. Further, the electric control means 704, in response to the control signal, performs control to the object 800.

In the present embodiment, due to the fact that the electric control means and the AC-DC converter are both located in the control panel, the size of the pluggable unit can be reduced further, and the cost is lower. The replacement of the pluggable unit becomes much easier.

The foregoing embodiments are the pluggable mechanisms for wireless remote control that are all used for simple manual switch control panels (i.e. there is only a manual switch on the control panel.). The present invention can also be used for the relatively complex manual control panels, such as a manual control panel of an electric fan that may control the wind speed and the wind direction, or a manual control panel of an air conditioner that may control the temperature, wind speed and operating modes.

Figure 9:
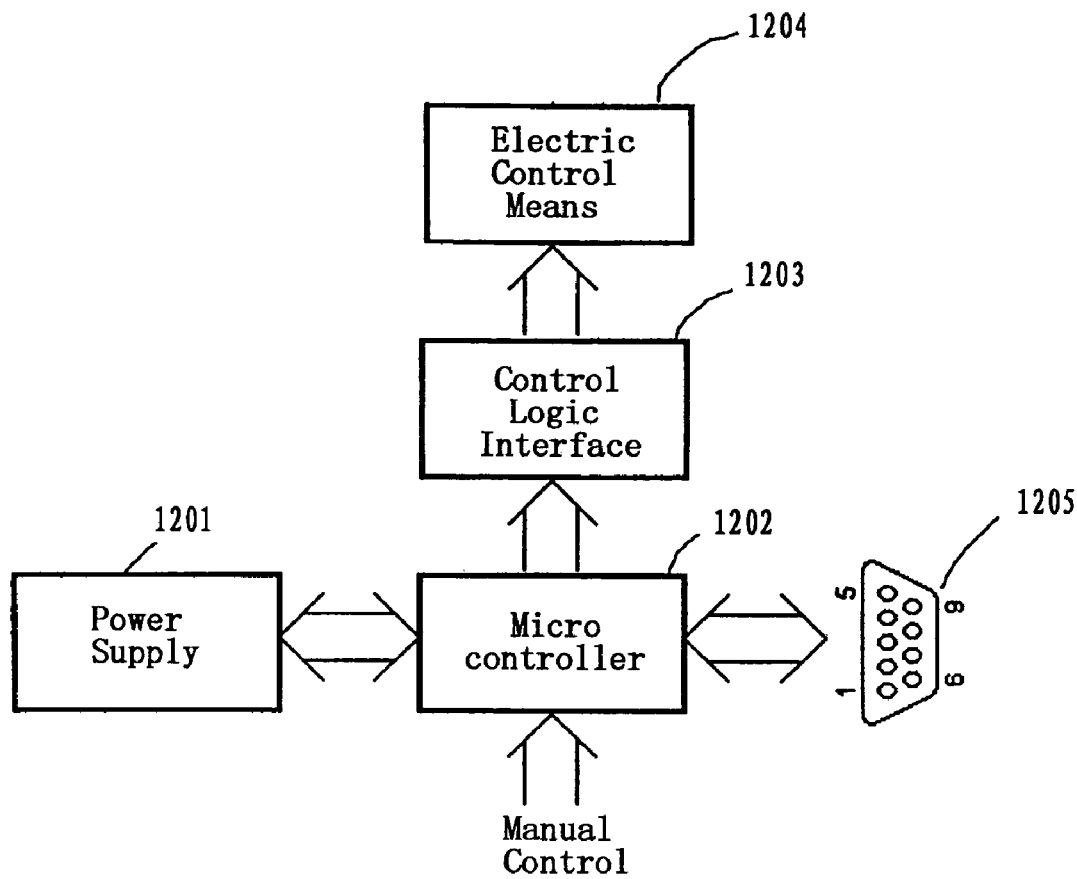
FIG. 9 is a schematic diagram showing the control panel of the pluggable mechanism for wireless remote control according to a fourth embodiment of the present invention.

FIG. 9 is a schematic diagram showing the control panel of the pluggable mechanism for wireless remote control according to a fourth embodiment of the present invention. The control panel shown in FIG. 9 is a manual control panel for an electric fan or an air conditioner. Such a control panel capable of performing complex controls usually has a set of keys (not shown) to allow the operator inputting manual control commands. The set of keys may include a plurality of keys, for example, keys for maximum wind speed or temperature reduction keys for minimum wind speed or temperature raise, etc. The operations on these keys will be converted to corresponding electric signals and transmitted to the microcontroller 1202. The microcontroller 1202 processes these signals by executing the preprogrammed instruction programs, or processes these signals in cooperation wit a central control CPU (not shown). The processing result may cause the microcontroller 1202 to send a control signal to the control logic interface 1203, through which the control signal is transmitted to the corresponding electric control means 1204, for example, a matrix switch, a pulse-width modulation (PWM) power controller, a digital potentiometer, etc., so as to control the object. Supposing that an operator presses a key representing minimum wind speed, this operation would be interpreted into a corresponding electric signal and transmitted to the microcontroller 1202. After the program's processing, the microcontroller 202 would generate a control signal for the PWM power controller which controls the motor speed. The control signal is transmitted to the corresponding PWM power controller through the control logic interface 1203. It results in the reduction of the output power from the PWM power controller to the motor and thus makes the motor speed slower and the wind speed lower.

Figure 10:
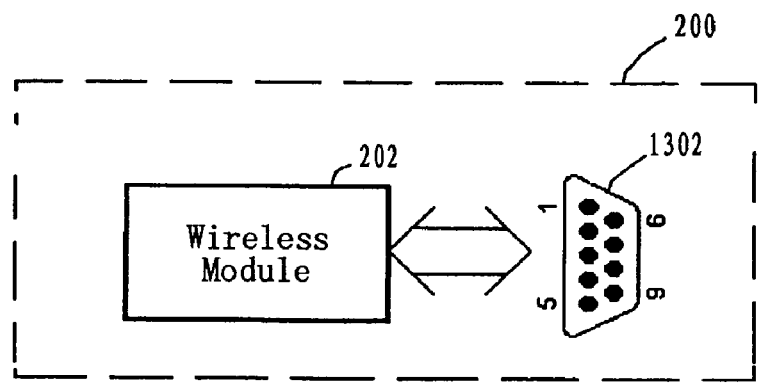
FIG. 10 is a schematic diagram showing the pluggable unit of the pluggable mechanism for wireless remote control according to the fourth embodiment of the present invention.

In the present embodiment, a receptacle 1205 connected to the microcontroller 1202, a DB-9 receptacle 1205 shown in FIG. 9, is added into the above-mentioned manual control panel. FIG. 10 is a schematic diagram of the pluggable unit of the pluggable mechanism for wireless remote control according to the fourth embodiment of the present invention. As shown in FIG. 10, the pluggable unit 200 of the present embodiment has a DB-9 plug and a wireless module 202.

In the present embodiment, the definitions of the pins in the DB-9 receptacle 1205 of the manual control panel are shown in Table 1:

TABLE 1

| definitions of the pins of the DB-9 receptacle | |
|---|---|
| PIN1 | Ground |
| PIN2 | Receiving data |
| PIN3 | Sending data |
| PIN4 | NULL |
| PIN5 | Ground |
| PIN6 | NULL |
| PIN7 | Request to Send (RTS) |
| PIN8 | Clear to Send (CTS) |
| PIN9 | Power supply |

Corresponding to the above receptacle 1205, the definitions of the pins in the DB-9 plug 1302 on the pluggable unit 200 are shown in Table 2:

TABLE 2

| definitions of the pins of the DB-9 plug | |
|---|---|
| PIN1 | Ground |
| PIN2 | Sending data |
| PIN3 | Receiving data |
| PIN4 | NULL |
| PIN5 | Ground |
| PIN6 | NULL |
| PIN7 | Clear to Send (CTS) |
| PIN8 | Request to Send (RTS) |
| PIN9 | Power supply |

When the pluggable unit 200 of the present embodiment is plugged into the DB-9 receptacle 1205 of the control panel 100 through its DB-9 plug 1302, the wireless module 202 will receive remote wireless control commands and generate control signals in response to the control command. The generated control signals are transmitted to the microcontroller 1202 in the control panel 100 through the connection between the plug 1302 and the receptacle 1205. The microcontroller 1202 processes the signals from the pluggable unit by executing preprogrammed instruction programs or processes these signals in cooperation with a central control CPU (not shown). Further, the microcontroller 1202 will send control signals to the corresponding electric control means 1204 through the control logic interface 1203 and the controlled object will be controlled by the electric control means 1204.

It should be noted that the plug 1302 and the receptacle 1205 may be in various forms besides the DB-9 plug, for example, DB-25 or RJ45, etc. And the definition of the electric interface between the receptacle and the plug can be customized.

From the above description of the present embodiment, it can be seen that the present embodiment can be used for a relatively complex manual control panel, like the control panel of an electric fan or an air conditioner, to perform remote wireless control.

In the above, the present invention has been described in conjunction with a plurality of embodiments. However, it should be understood that these embodiments do not include all implementations of the present invention, and the description in respect to the embodiments should not limit the scope of the present invention. The scope of the present invention is subject to the appended claims.

The invention claimed is:

1. A pluggable mechanism for wireless remote control, comprising:
    a control panel for controlling an object, said control panel having a receptacle; and
    a pluggable unit having a plug that is suitable to be plugged into said receptacle of said control panel, and being capable of receiving remote wireless control commands, said pluggable unit cooperates with said control panel to control said controlled object in response to said received wireless control commands when said pluggable unit being plugged into said receptacle of said control panel;
    wherein said pluggable unit comprises,
    a wireless module for receiving said remote wireless control commands and generating control signals in response to said wireless control commands;
    an electrical control means for controlling said controlled object in response to said control signals generated by said wireless module; and
    an AC-DC converter for converting an alternating current into a direct current and supplying to said wireless module; and
    wherein said plug of said pluggable unit has three pins, said control panel further has a manual switch, two input terminals and two output terminals, and said receptacle of said control panel having three contacts;
    wherein said two input terminals of said control panel are coupled to two lines of a power supply respectively, a first contact and a second contact of said three contacts of said receptacle are coupled to said two input terminals, a third contact of said three contacts is coupled to an output of said manual switch; and a first pin and a second pin of said three pins of said pluggable unit are coupled to two inputs of said AC-DC converter respectively, and said electrical control means is connected between said second pin and a third pin of said three pins.

2. A pluggable mechanism for wireless remote control of claim 1, wherein said pluggable unit is capable of receiving wireless control commands transmitted via radio frequency, infrared, laser or ultrasonic wave.

3. A pluggable mechanism for wireless remote control of claim 1, wherein said electrical control means is one selected from a group consisting of electrical switch, digital potentiometer, voltage divider, switch matrix and pulse-width modulation (PWM).

4. A pluggable mechanism for wireless remote control of claim 1, wherein said wireless module in said pluggable unit comprises:
    wireless communication means for enabling wireless communication function and receiving said wireless control commands;
    a microprocessor for executing a preprogrammed instruction program, processing said wireless control commands received by said wireless communication means and generating control signals; and
    a control logic interface for outputting said control signals generated by said microprocessor.

5. A pluggable mechanism for wireless remote control of claim 1, wherein said wireless module in said pluggable unit comprises;
    wireless communication means for enabling wireless communication function and receiving said wireless control commands;
    a CPU for executing preprogrammed program instructions, implementing a communication protocol stack, processing said wireless control commands received by said wireless communication means and generating control signals;
    memory means for storing said wireless communication protocol stack and one or more application programs for the processing of said CPU; and
    a control logic interface for outputting said control signals generated by said microprocessor.

6. A pluggable mechanism for wireless remote control of claim 1, wherein said control panel further comprises a microprocessor connected to said receptacle for executing a preprogrammed instruction program and processing said control signals from said pluggable unit; and a control logic interface for connecting said microprocessor to said electrical control means.

7. A pluggable mechanism for wireless remote control, comprising:
    a control panel for controlling an object, said control panel having a receptacle, a manual switch, two input terminals, and two output terminals; and
    a pluggable unit having a plug that is suitable to be plugged into said receptacle of said control panel, and being capable of receiving remote wireless control commands, said pluggable unit cooperates with said control panel to control said controlled object in response to said received wireless control commands when said pluggable unit being plugged into said receptacle of said control panel;
    wherein said pluggable unit comprises:
    a wireless module for receiving said remote wireless control commands and generating control signals in response to said wireless control commands;
    an electrical control means for controlling said controlled object in response to said control signals generated by said wireless module; and
    an AC-DC converter for converting an alternating current into a direct current and supplying to said wireless module;

wherein said plug of said pluggable unit has three pins, and said receptacle of said control panel has three contacts;

wherein said two input terminals of said control panel are coupled to two lines of a power supply respectively, a first contact and a second contact of said three contacts of said receptacle are coupled to two outputs of said AC-DC converter respectively, a third contact or said three contacts is coupled to a signal input of said electrical control means, said manual switch is connected with said electrical control means in parallel; and a first pin and a second pin of said three pins of said pluggable unit are coupled to two power inputs of said wireless module respectively, a third pin of said three pins is coupled to an output of said wireless module.

8. A pluggable unit having a plug and being capable of receiving remote wireless control commands, wherein said pluggable unit cooperates with a control panel to control an object in response to said received wireless control commands when said pluggable unit being plugged into a receptacle of said control panel;

wherein said pluggable unit comprises a wireless module for receiving said remote wireless control commands and generating control signals in response to said wireless control commands;

wherein said plug of said pluggable unit has three pins, a first pin and a second pin of which are coupled to two power inputs of said wireless module, and a third pin of which is coupled to an output of said wireless module.

9. A pluggable unit of claim 8, wherein said wireless module is capable of receiving wireless control commands transmitted via radio frequency, infrared, laser or ultrasonic wave.

10. A pluggable unit of claim 8, wherein said wireless module comprises:

wireless communication means for enabling wireless communication function and receiving said wireless control commands;

a microprocessor for executing a preprogrammed instruction program, processing said wireless control commands received by said wireless communication means and generating control signals; and a control logic interface for outputting said control signals generated by said microprocessor.

11. A pluggable unit of claim 8, wherein said wireless module comprises:

wireless communication means for enabling wireless communication function and receiving said wireless control commands; a CPU for executing a preprogrammed instruction program, implementing a communication protocol stack, processing said wireless control commands received by said wireless communication means and generating control signals;

memory means for storing said wireless communication protocol stack and one or more application programs for the processing of said CPU; and a control logic interface for outputting said control signals generated by said microprocessor.

12. A pluggable unit of claim 8, wherein said pluggable unit further comprises a electrical control means for controlling said controlled object in response to said control signals generated by said wireless module.

13. A pluggable unit of claim 12, wherein said pluggable unit further comprises an AC-DC converter for converting an alternating current into an direct current.

14. A pluggable unit, having a plug and being capable of receiving remote wireless control commands, wherein said pluggable unit cooperates with a control panel to control an object in response to said received wireless control commands when said pluggable unit being plugged into a receptacle of said control panel;

said pluggable unit further comprises a wireless module for receiving said remote wireless control commands and generating control signals in response to said wireless control commands; and an AC-DC converter for converting an alternating current into an direct current;

wherein said plug of said pluggable unit has four pins, a first pin and a second pin of which are coupled to two inputs of said AC-DC converter respectively, and a third pin and a fourth pin of which are coupled to two outputs of said wireless module.

* * * * *